US012603684B2

(12) United States Patent
Tian et al.

(10) Patent No.: US 12,603,684 B2
(45) Date of Patent: Apr. 14, 2026

(54) METHOD AND DEVICE FOR COMMUNICATION

(71) Applicant: GUANGDONG OPPO MOBILE TELECOMMUNICATIONS CORP., LTD., Dongguan (CN)

(72) Inventors: Jiejiao Tian, Dongguan (CN); Wenqiang Tian, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 514 days.

(21) Appl. No.: 17/812,695

(22) Filed: Jul. 14, 2022

(65) Prior Publication Data

US 2022/0352952 A1     Nov. 3, 2022

Related U.S. Application Data

(63) Continuation of application No. PCT/CN2020/073020, filed on Jan. 19, 2020.

(51) Int. Cl.
*H04B 7/06*          (2006.01)
*H04B 17/391*      (2015.01)

(52) U.S. Cl.
CPC ......... *H04B 7/0626* (2013.01); *H04B 17/391* (2015.01)

(58) Field of Classification Search
None
See application file for complete search history.

(56) References Cited

U.S. PATENT DOCUMENTS

| | | | | |
|---|---|---|---|---|
| 2018/0062724 A1* | 3/2018 | Onggosanusi | ....... | H04B 7/0478 |
| 2020/0364571 A1* | 11/2020 | Xu | ........................... | G06N 7/01 |

FOREIGN PATENT DOCUMENTS

| | | | | |
|---|---|---|---|---|
| CN | 102468939 | 7/2015 | | |
| CN | 108390706 | 8/2018 | | |
| CN | 108737036 | 11/2018 | | |
| CN | 109450830 | 3/2019 | | |
| CN | 110383710 | 10/2019 | | |
| WO | 2018236932 | 12/2018 | | |
| WO | WO-2019119442 A1 * | 6/2019 | ............. | H04B 7/024 |

OTHER PUBLICATIONS

WIPO, International Search Report and Written Opinion for PCT/CN2020/073020, Oct. 27, 2020.
EPO, Extended European Search Report for EP Application No. 20913745.4, Nov. 28, 2022.
EPO, Communication for EP Application No. 20913745.4, Apr. 4, 2025.

* cited by examiner

*Primary Examiner* — Derrick W Ferris
*Assistant Examiner* — Keith Follansbee
(74) *Attorney, Agent, or Firm* — Hodgson Russ LLP

(57)     ABSTRACT
Provided are a method and device for communication. The method comprises: a network device transmits first information to a terminal device, the first information being used for indicating whether the network device acquires downlink channel information via an artificial intelligence algorithm model, and the artificial intelligence algorithm model being constructed by training with past uplink channel information and past downlink channel information serving as samples. A terminal device measures a channel state on the basis of the first information to acquire channel state information.

11 Claims, 5 Drawing Sheets

METHOD AND DEVICE FOR COMMUNICATION

CROSS-REFERENCE TO RELATED APPLICATION

This application is a continuation of International Application No. PCT/CN2020/073020, filed Jan. 19, 2020, the entire disclosure of which is incorporated herein by reference.

TECHNICAL FIELD

The present disclosure relates to the field of communication technology, and particularly, to a communication method and apparatus.

BACKGROUND

In a long term evolution (LTE) system and a 5G (new radio, NR) system, the feedback of channel state information may determine the performance of multiple-in multiple-out (MIMO) transmission.

In the related art, a network device usually configures some configuration parameters for channel state information measurement in advance, such as a synchronization signal block (SSB) or a configuration parameter of channel state information (Channel-State Information Reference Signal, CSI-RS). A terminal device measures the channel state according to the configuration parameter sent by the network device, then determines the current channel state information, and feeds back the current channel state information to the network device, so that the network device can configure a reasonable and efficient data transmission method based on the current channel state information.

However, when measuring the channel state, it can hardly reflect the actual current channel state information very accurately if just considering factors such as feedback overhead and quantization, and the resulting errors are not conducive to the accurate scheduling of channel resources in future communication systems.

SUMMARY

The embodiments of the present disclosure provide a communication method and apparatus, so as to solve the problem that the channel resource cannot be accurately scheduled in the communication system in the related art.

A first aspect of the present disclosure provides a communication method, including:

sending first information to a terminal device, where the first information is configured to indicate whether a network device obtains downlink channel information through an artificial intelligence algorithm model, and the artificial intelligence algorithm model is established by training using historical uplink channel information and historical downlink channel information as samples.

In an optional implementation manner, the method further includes:

sending at least one configuration parameter of channel state information to the terminal device, where the at least one configuration parameter of the channel state information is used for the terminal device to determine a target configuration parameter according to the first information, for performing channel state measurement to obtain the channel state information;

where time-frequency resources and/or port densities of different configuration parameters of channel state are different.

In an optional implementation manner, the method further includes:

sending second information to the terminal device, where the second information is configured to indicate a type of channel state information reported by the terminal device.

In an optional implementation manner, different types of the channel state information report different amounts of information.

In an optional implementation manner, the types of the channel state information includes a first type and a second type, and the amount of information reported for the first type is less than or equal to the amount of information reported for the second type.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In an optional implementation manner, the method further includes:

receiving the channel state information reported by the terminal device according to the second information;

generating a downlink precoding matrix according to the channel state information and the downlink channel information;

encoding data according to the downlink precoding matrix; and transmitting encoded data to the terminal device.

In an optional implementation manner, the method further includes:

generating a downlink precoding matrix according to the downlink channel information, in a case that the downlink channel information is obtained through the artificial intelligence algorithm model and the downlink channel information is complete.

In an optional implementation manner, the method further includes:

receiving uplink channel information sent by the terminal device;

inputting the uplink channel information into the artificial intelligence algorithm model, and obtaining the downlink channel information output by the artificial intelligence algorithm model.

In an optional implementation manner, the first information is further configured to indicate whether the network device has channel reciprocity.

In an optional implementation manner, the first information is sent to the terminal device through broadcast information;

or, the first information is sent to the terminal device through a random access procedure;

or, the first information is sent to the terminal device through a Radio Resource Control (RRC) dedicated signaling;

or, the first information is sent to the terminal device through a Media Access Control-Control Element (MAC-CE);

or, the first information is sent to the terminal device through Downlink Control Information (DCI).

In an optional implementation manner, the at least one configuration parameter of channel state is sent to the terminal device through broadcast information or an RRC dedicated signaling.

In an optional implementation manner, the second information is sent to the terminal device through broadcast information;

or, the second information is sent to the terminal device through a random access procedure;

or, the second information is sent to the terminal device through a RRC dedicated signaling;

or, the second information is sent to the terminal device through a MAC-CE;

or, the second information is sent to the terminal device through DCI.

In an optional implementation manner, the artificial intelligence algorithm model includes: a deep learning model and/or a machine learning model.

In an optional implementation manner, the deep learning model includes a convolutional neural network module, and the machine learning model includes at least one of the following models: a classification algorithm model, a regression algorithm model, a clustering algorithm model and a dimensionality reduction algorithm model.

A second aspect of the present disclosure provides a communication method, including:

receiving first information sent by a network device, where the first information is configured to indicate whether the network device obtains downlink channel information through an artificial intelligence algorithm model, and the artificial intelligence algorithm model is established by training using historical uplink channel information and historical downlink channel information as samples; and measuring channel state according to the first information to obtain channel state information.

In an optional implementation manner, the method further includes:

receiving at least one configuration parameter of channel state information sent by the network device, where time-frequency resources and/or port densities of different configuration parameters of channel state are different;

the measuring channel state according to the first information to obtain channel state information, includes:

determining a target configuration parameter among the at least one configuration parameter of channel state information according to the first information, for performing channel state measurement to obtain the channel state information.

In an optional implementation manner, the method further includes:

receiving second information sent by the network device, where the second information is configured to indicate a type of channel state information reported by the terminal device; and reporting the channel state information to the network device according to the type of the channel state information indicated by the second information.

In an optional implementation manner, different types of the channel state information report different amounts of information.

In an optional implementation manner, the types of the channel state information includes a first type and a second type, and the amount of information reported for the first type is less than or equal to the amount of information reported for the second type.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In an optional implementation manner, the first information is further configured to indicate whether the network device has channel reciprocity.

In an optional implementation manner, the first information is sent to the terminal device through broadcast information;

or, the first information is sent to the terminal device through a random access procedure;

or, the first information is sent to the terminal device through a Radio Resource Control (RRC) dedicated signaling;

or, the first information is sent to the terminal device through a Media Access Control-Control Element (MAC-CE);

or, the first information is sent to the terminal device through Downlink Control Information (DCI).

In an optional implementation manner, the at least one configuration parameter of channel state is sent to the terminal device through broadcast information or an RRC dedicated signaling.

In an optional implementation manner, the second information is sent to the terminal device through broadcast information;

or, the second information is sent to the terminal device through a random access procedure;

or, the second information is sent to the terminal device through an RRC dedicated signaling;

or, the second information is sent to the terminal device through a MAC-CE;

or, the second information is sent to the terminal device through DCI.

In an optional implementation manner, the artificial intelligence algorithm model includes: a deep learning model and/or a machine learning model.

In an optional implementation manner, the deep learning model includes a convolutional neural network module, and the machine learning model includes at least one of the following models: a classification algorithm model, a regression algorithm model, a clustering algorithm model and a dimensionality reduction algorithm model.

A third aspect of the present disclosure provides a communication apparatus, including:

a sending module, configured to send first information to a terminal device, where the first information is configured to indicate whether a network device obtains downlink channel information through an artificial intelligence algorithm model, and the artificial intelligence algorithm model is established by training using historical uplink channel information and historical downlink channel information as samples.

In an optional implementation manner, the sending module is further configured to send at least one configuration parameter of channel state information to the terminal device, where the at least one configuration parameter of the channel state information is used for the terminal device to determine a target configuration parameter according to the first information, for performing channel state measurement to obtain the channel state information;

where time-frequency resources and/or port densities of different configuration parameters of channel state are different.

In an optional implementation manner, the sending module is further configured to send second information to the terminal device, where the second information is configured to indicate a type of channel state information reported by the terminal device.

In an optional implementation manner, different types of the channel state information report different amounts of information.

In an optional implementation manner, the types of the channel state information includes a first type and a second type, and the amount of information reported for the first type is less than or equal to the amount of information reported for the second type.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In an optional implementation manner, the apparatus further includes: a receiving module and a processing module;

the receiving module is configured to receive the channel state information reported by the terminal device according to the second information;

the processing module is configured to generate a downlink precoding matrix according to the channel state information and the downlink channel information, and encode data according to the downlink precoding matrix; and the sending module is further configured to transmit encoded data to the terminal device.

In an optional implementation manner, the processing module is configured to generate a downlink precoding matrix according to the downlink channel information, in a case that the downlink channel information is obtained through the artificial intelligence algorithm model and the downlink channel information is complete.

In an optional implementation manner, the receiving module is further configured to receive uplink channel information sent by the terminal device; and the processing module is further configured to input the uplink channel information into the artificial intelligence algorithm model, and obtain the downlink channel information output by the artificial intelligence algorithm model.

In an optional implementation manner, the first information is further configured to indicate whether the network device has channel reciprocity.

In an optional implementation manner, the first information is sent to the terminal device through broadcast information;

or, the first information is sent to the terminal device through a random access procedure;

6 or, the first information is sent to the terminal device through a Radio Resource Control (RRC) dedicated signaling;

or, the first information is sent to the terminal device through a Media Access Control-Control Element (MAC-CE);

or, the first information is sent to the terminal device through Downlink Control Information (DCI).

In an optional implementation manner, the at least one configuration parameter of channel state is sent to the terminal device through broadcast information or an RRC dedicated signaling.

In an optional implementation manner, the second information is sent to the terminal device through broadcast information;

or, the second information is sent to the terminal device through a random access procedure;

or, the second information is sent to the terminal device through an RRC dedicated signaling;

or, the second information is sent to the terminal device through a MAC-CE;

or, the second information is sent to the terminal device through DCI.

In an optional implementation manner, the artificial intelligence algorithm model includes: a deep learning model and/or a machine learning model.

In an optional implementation manner, the deep learning model includes a convolutional neural network module, and the machine learning model includes at least one of the following models: a classification algorithm model, a regression algorithm model, a clustering algorithm model and a dimensionality reduction algorithm model.

A fourth aspect of the present disclosure provides an communication apparatus, including:

a receiving module, configured to receive first information sent by a network device, where the first information is configured to indicate whether the network device obtains downlink channel information through an artificial intelligence algorithm model, and the artificial intelligence algorithm model is established by training using historical uplink channel information and historical downlink channel information as samples; and a processing module, configured to measure channel state according to the first information to obtain channel state information.

In an optional implementation manner, the receiving module is further configured to receive at least one configuration parameter of channel state information sent by the network device, where time-frequency resources and/or port densities of different configuration parameters of channel state are different; and the processing module is specifically configured to determine a target configuration parameter among the at least one configuration parameter of channel state information according to the first information, for performing channel state measurement to obtain the channel state information.

In an optional implementation manner, the receiving module is specifically configured to receive second information sent by the network device, where the second information is configured to indicate a type of channel state information reported by the terminal device; and the apparatus further includes: a sending module;

the sending module is configured to report the channel state information to the network device according to the type of the channel state information indicated by the second information.

In an optional implementation manner, different types of the channel state information report different amounts of information.

In an optional implementation manner, the types of the channel state information includes a first type and a second type, and the amount of information reported for the first type is less than or equal to the amount of information reported for the second type.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In an optional implementation manner, the first information is further configured to indicate whether the network device has channel reciprocity.

In an optional implementation manner, the first information is sent to the terminal device through broadcast information;

or, the first information is sent to the terminal device through a random access procedure;

or, the first information is sent to the terminal device through a Radio Resource Control (RRC) dedicated signaling;

or, the first information is sent to the terminal device through a Media Access Control-Control Element (MAC-CE);

or, the first information is sent to the terminal device through Downlink Control Information (DCI).

In an optional implementation manner, the at least one configuration parameter of channel state is sent to the terminal device through broadcast information or an RRC dedicated signaling.

In an optional implementation manner, the second information is sent to the terminal device through broadcast information;

or, the second information is sent to the terminal device through a random access procedure;

or, the second information is sent to the terminal device through an RRC dedicated signaling;

or, the second information is sent to the terminal device through a MAC-CE;

or, the second information is sent to the terminal device through DCI.

In an optional implementation manner, the artificial intelligence algorithm model includes: a deep learning model and/or a machine learning model.

In an optional implementation manner, the deep learning model includes a convolutional neural network module, and the machine learning model includes at least one of the following models: a classification algorithm model, a regression algorithm model, a clustering algorithm model and a dimensionality reduction algorithm model.

A fifth aspect of the present disclosure provides a network device, the terminal device includes: a processor, a memory, a sender and a receiver; the sender and the receiver are coupled to the processor, the processor controls the sending action of the sender, and the processor controls the receiving action of the receiver.

The memory is configured to store a program code executable by a computer, and the program code includes information; when the processor executes the information, the information enables the terminal device to perform the communication method provided by the first aspect and each optional implementation manner according to the first aspect.

A sixth aspect of the present disclosure provides a terminal device, the terminal device includes: a processor, a memory, a sender and a receiver; the sender and the receiver are coupled to the processor, the processor controls the sending action of the sender, and the processor controls receiving action of the receiver.

The memory is configured to store a program code executable by a computer, and the program code includes information; when the processor executes the information, the information enables the network device to perform the communication method provided by the second aspect and each optional implementation manner according to the second aspect.

A seventh aspect of the present disclosure provides a chip, including a processor, configured to invoke and run a computer program from a memory to enable a device on which the chip is installed executes the communication method provided by the first aspect and each optional implementation manner according to the first aspect.

An eighth aspect of the present disclosure provides a chip, including a processor, configured to invoke and run a computer program from a memory to enable a device on which the chip is installed executes the communication method provided by the second aspect and each optional implementation manner according to the second aspect.

A ninth aspect of the present disclosure provides a computer-readable storage medium, configured to store a computer program, and the computer program enables a computer to execute the communication method provided by the first aspect and each optional implementation manner according to the first aspect.

A tenth aspect of the present disclosure provides a computer-readable storage medium, configured to store a computer program, and the computer program enables a computer to execute the communication method provided by the first aspect and each optional implementation manner according to the second aspect.

An eleventh aspect of the present disclosure provides a computer program product, including computer program information, and the computer program information enables a computer to execute the communication method provided by the first aspect and each optional implementation manner according to the first aspect.

A twelfth aspect of the present disclosure provides a computer program product, including computer program information, and the computer program information enables a computer to execute the communication method provided by the second aspect and each optional implementation manner according to the second aspect.

A thirteenth aspect of the present disclosure provides a computer program, and the computer program enables a computer to execute the communication method provided by the first aspect and each optional implementation manner according to the first aspect.

A fourteenth aspect of the present disclosure provides a computer program, and the computer program enables a computer to execute the communication method provided by the second aspect and each optional implementation manner according to the second aspect.

In the communication method and apparatus provided by the embodiments of the present disclosure, the network device sends first information to the terminal device, and the first information is configured to indicate whether the network device obtains downlink channel information through an artificial intelligence algorithm model, and the artificial intelligence algorithm model is established by training using historical uplink channel information and historical downlink channel information as samples. The terminal device measures the channel state according to the first information, and obtains the channel state information. In this way, the terminal device can know the way through which the network device obtains the downlink channel information, and then the terminal device can use the corresponding parameter to measure the channel state according to different ways through which the network device obtains the downlink channel information, which reduces the error of the measured channel state information, thereby realizing accurate scheduling of channel resources in the communication system.

BRIEF DESCRIPTION OF THE DRAWINGS

In order to illustrate the technical solutions in the present disclosure or the related art more clearly, the following briefly introduces the drawings that need to be used in the description of the embodiments or the related art. Obviously, the drawings in the following description are only some embodiments of the present disclosure. For those of ordinary skill in the art, other drawings can also be obtained from these drawings without paying creative effort.

DETAILED DESCRIPTION

Figure 1:
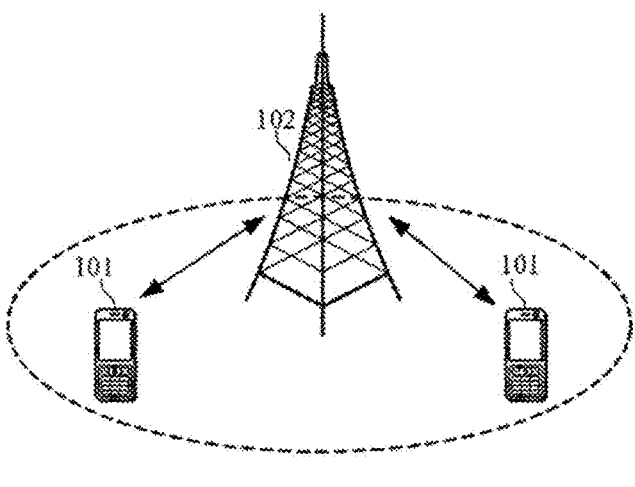
FIG. 1 is a schematic diagram of a scenario of a communication method provided by an embodiment of the present disclosure.

In order to make the objectives, technical solutions and advantages of the present disclosure clearer, the technical solutions in the embodiments of the present disclosure will be clearly and completely described below with reference to the accompanying drawings in the embodiments of the present disclosure. Obviously, the described embodiments are a part of, but not all, embodiments of the present disclosure. Based on the embodiments of the present disclosure, all other embodiments obtained by those of ordinary skill in the art without creative efforts shall fall within the protection scope of the present disclosure.

In a long term evolution (LTE) system and a 5G (new radio, NR) system, the feedback of channel state information may determine the performance of multiple-in multiple-out (MIMO) transmission.

In the related art, a network device usually configures some configuration parameters for channel state information measurement in advance, such as a synchronization signal block (SSB) or a configuration parameter of channel state information (Channel-State Information Reference Signal, CSI-RS). A terminal device measures the channel state according to the configuration parameters sent by the network device, then determines the current channel state information, and feeds back the current channel state information to the network device, so that the network device can configure a reasonable and efficient data transmission method based on the current channel state information.

However, when measuring the channel state, it can hardly reflect the actual current channel state information very accurately if just considering factors such as feedback overhead and quantization, and the resulting error is not conducive to the accurate scheduling of channel resources in future communication systems.

In order to solve the above problems and achieve accurate scheduling of channel resources in the communication system, it is necessary to improve the accuracy of channel state information. Since the completeness of downlink information obtained by different methods for acquiring downlink channel information is different, some network devices use the artificial intelligence algorithm model to obtain downlink channel information, while other network devices do not use the artificial intelligence algorithm model to obtain downlink channel information. The terminal device selects a parameter corresponding to the completeness of the downlink channel information to measure the channel state, and its measured channel state information has less error. Therefore, in the present application, the network device sends first information to the terminal device to inform the terminal device whether to obtain the downlink channel information through the artificial intelligence algorithm model, so that the terminal device can measure the channel state according to the first information, thereby reducing the error of the measured channel state information, and achieving the accurate scheduling of the channel resource in the communication system.

FIG. 1 is a schematic diagram of a scenario of a communication method provided by an embodiment of the present disclosure. As shown in FIG. 1, communication is performed between the terminal device 101 and the network device 102. After acquiring the downlink channel information, the network device 102 may send information to the terminal device 101 to indicate the way through which the network device 102 acquires the downlink channel information.

The embodiments of the present application do not limit the numbers of terminal devices 101 and network devices 102 included in the communication system.

The terminal device 101 may also be referred to as a Terminal, a user equipment (UE), a mobile station (MS), a mobile terminal (MT), etc. The terminal device 101 may be a mobile phone, a tablet computer (pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in smart home, etc.

The network device 102 may be, for example, a base station, or various wireless access points, or may refer to a device in the network that communicates with user equipment through one or more sectors over an air interface. The base station may be configured to convert received air frames to and from IP packets, acting as a router between the wireless terminal and the rest of the network, where the rest of the network may include an Internet Protocol (IP) network. The base station may also coordinate the management of the attributes of the air interface. For example, the base station may be a base transceiver station (BTS) in a global system of mobile communication (GSM) or a code division multiple access (CDMA), or a base station (NodeB, NB) in a wideband code division multiple access (WCDMA), or an evolutional base station (eNB or eNodeB) in long term evolution (LTE), or a relay station or an access point, or a base station (gNB) in the future 5G network, etc., which is not limited here.

It should be noted that the communication methods involved in the embodiments of the present application may be applied to various communication systems, and the implementation of the present application does not limit the applicable communication systems, which may be NR communication system or other communication systems.

It should be noted that the application scenario shown in FIG. 1 is only one available scenario of the present application, and the present application may also be applied to any other scenario where the channel state needs to be measured.

The technical solutions of the embodiments of the present application will be described in detail below with specific embodiments by taking the terminal device and the network device as an example. The following specific embodiments may be combined with each other, and the same or similar concepts or processes may not be repeated in some embodiments.

Figure 2:
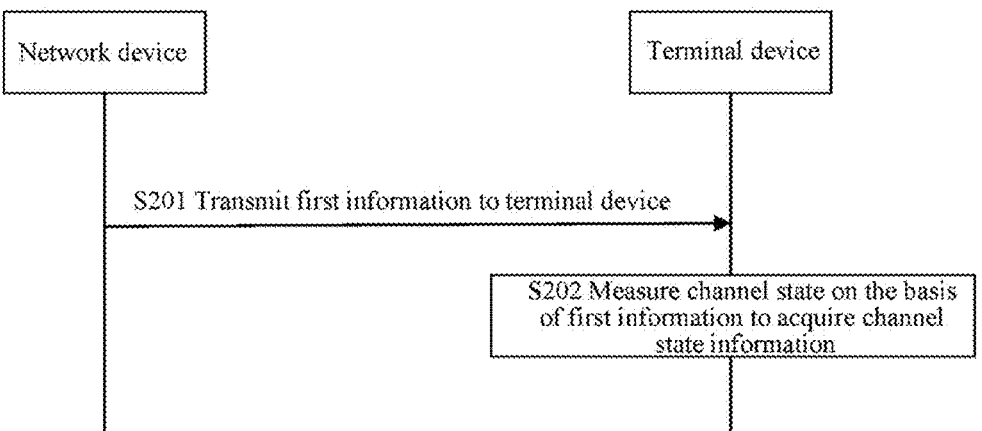
FIG. 2 is a signaling interaction diagram of a communication method provided by an embodiment of the present disclosure.

FIG. 2 is a signaling interaction diagram of a communication method provided by an embodiment of the present disclosure. This embodiment relates to a process of how a terminal device and a network device interact. As shown in FIG. 2, the method includes the following steps.

In S201, the network device sends first information to the terminal device, and the first information is configured to indicate whether the network device obtains downlink channel information through an artificial intelligence algorithm model, and the artificial intelligence algorithm model is established by training using historical uplink channel information and historical downlink channel information as samples.

In this step, after acquiring the downlink channel information, the network device may send the first information to the terminal device according to whether the downlink channel information is acquired through the artificial intelligence algorithm model.

The embodiments of the present application do not limit the types of the artificial intelligence algorithm module, and the artificial intelligence algorithm model may include a deep learning model and/or a machine learning model.

Exemplarily, the deep learning model may include a convolutional neural network module, and the machine learning model may include at least one of the following models: a classification algorithm model, a regression algorithm model, a clustering algorithm model and a dimensionality reduction algorithm model.

In some embodiments, the downlink channel information is obtained through the artificial intelligence algorithm model, and the uplink channel information is taken as input by the network device and the downlink channel information is output by the trained artificial intelligence algorithm model. The uplink channel information may be acquired from a channel sounding configuration parameter (sounding reference signal, SRS).

In the present application, obtaining downlink channel information through artificial intelligence algorithm model can better circumvent the problem of large error between restored CSI information and real CSI information in the conventional model-based and codebook-based CSI feedback mechanisms. Meanwhile, the artificial intelligence algorithm model can achieve the purpose of saving uplink signaling overhead and downlink resource overhead.

It should be noted that the present application does not limit how to train the artificial intelligence algorithm model, and the selection of training samples may be set according to actual conditions.

In some optional implementation manners, if the network device obtains the downlink channel information through the artificial intelligence algorithm model, then specifically, the network device may receive the uplink channel information sent by the terminal device, and input the uplink channel information into the artificial intelligence algorithm model to obtain the downlink channel information output by the artificial intelligence algorithm model.

The embodiments of the present application do not limit how to send the first information. In some optional implementation manners, the first information may be sent to the terminal device through broadcast information. For example, the broadcast information may include a Master information block (MIB), a system information block (SIB) 1, and other SIB messages.

In some optional implementation manners, the first information may be sent to the terminal device through a random access procedure, for example, a message sent by a network device in a two-step random access procedure, or a random access response or contention resolution message sent by a network device in a four-step random access procedure.

In some optional implementation manners, the first information may be sent to the terminal device through a radio resource control (RRC) dedicated signaling.

In some optional implementation manners, the first information may be sent to the terminal device through a media access control-control element (MAC-CE).

In some optional implementation manners, the first information may be sent to the terminal device through downlink control information (DCI).

It should be noted that, in some embodiments, the first information may also be configured to indicate whether the network device has channel reciprocity, that is, whether channel fading experienced by the transmitted signals of the uplink and downlink is the same.

In S202, the terminal device measures the channel state according to the first information, and acquires channel state information.

In this step, after receiving the first information sent by the network device, the terminal device may measure the channel state according to the first information to obtain the channel state information.

In some embodiments, the network device may send at least one configuration parameter of channel state (channel-state information reference signal, CSI-RS) to the terminal device in advance, and there is a mapping relationship between the CSI-RS and the way of acquiring downlink channel information. The terminal device may select a target CSI-RS from a plurality of CSI-RSs to perform channel state according to the first information to obtain channel state information.

In other embodiments, the terminal device may be pre-configured with two channel state measurement methods, and each of the two measurement methods respectively corresponds to whether or not the downlink channel information is acquired through the artificial intelligence algorithm model. After receiving the first information, the terminal device may select one of the two measurement modes to perform channel state measurement according to the indication of the first information, and the measurement parameters of the two measurement methods are different.

It should be noted that the above-mentioned first information may be used not only for measuring the channel state, but also in any scenario where it is necessary to be informed of the way through which the network device obtains the downlink channel information, which is not limited by the embodiments of the present disclosure.

In the communication method provided by the embodiments of the present disclosure, the network device sends first information to the terminal device, and the first information is configured to indicate whether the network device obtains downlink channel information through an artificial intelligence algorithm model, and the artificial intelligence algorithm model is established by training using historical uplink channel information and historical downlink channel information as samples. The terminal device measures the channel state according to the first information, and obtains the channel state information. In this way, the terminal device can know the way through which the network device obtains the downlink channel information, and then the terminal device can use the corresponding parameter to measure the channel state according to the difference between the ways through which the network device obtains the downlink channel information, which reduces the error of the measured channel state information, thereby realizing accurate scheduling of channel resources in the communication system.

Figure 3:
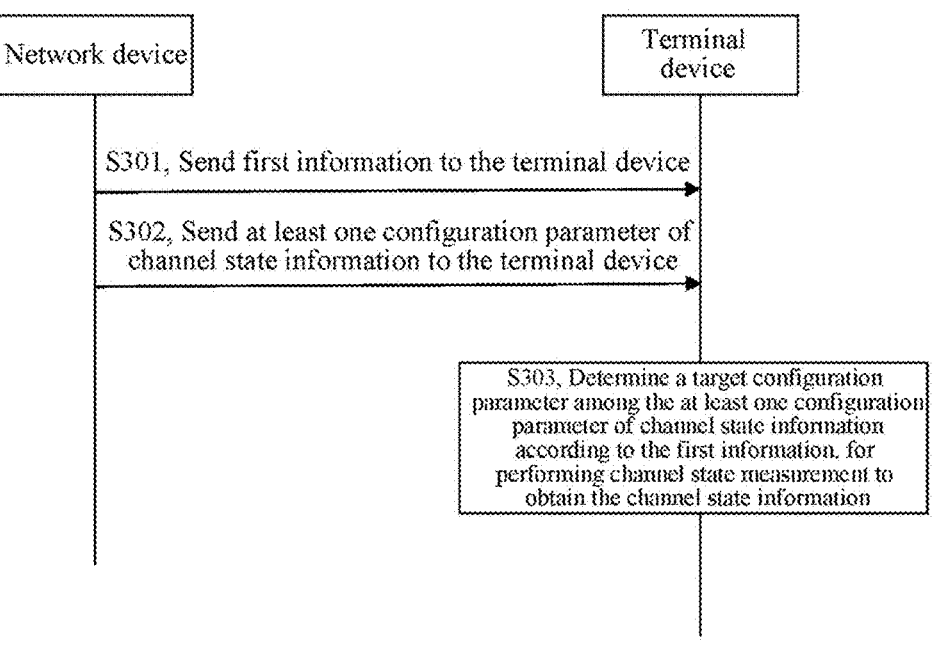
FIG. 3 is a signaling interaction diagram of another communication method provided by an embodiment of the present disclosure.

Based on the above embodiments, the following describes specifically how the network device measures the channel state by sending at least one configuration parameter of channel state to the terminal device. FIG. 3 is a signaling interaction diagram of another communication method provided by an embodiment of the present disclosure. As shown in FIG. 3, the communication method includes the following steps.

In S301, the network device sends first information to the terminal device, and the first information is configured to indicate whether the network device obtains downlink channel information through an artificial intelligence algorithm model, and the artificial intelligence algorithm model is established by training using historical uplink channel information and historical downlink channel information as samples.

The technical terminologies, technical effects, technical features, and optional implementation manners of S301 may be understood with reference to S201 shown in FIG. 2, and repeated content will not be elaborated here.

In S302, the network device sends at least one configuration parameter of channel state information to the terminal device, where the at least one configuration parameter of the channel state information is used for the terminal device to determine a target configuration parameter according to the first information, for performing channel state measurement to obtain the channel state information;

where time-frequency resources and/or port densities of different configuration parameters of channel state are different.

The embodiments of the present disclosure do not limit when the network device sends the at least one configuration parameter of the channel state information to the terminal device. In some embodiments, the network device may send the at least one configuration parameter of the channel state information when the terminal device first accesses. In some embodiments, the network device may send the at least one configuration parameter of the channel state information after sending the first information to the terminal device. In other embodiments, the network device may send the at least one configuration parameter of the channel state information before sending the first information to the terminal device.

The number of the configuration parameters of the channel state information is not limited in the embodiments of the present application, either, and can be set specifically according to the actual situation.

In some optional implementation manners, the at least one configuration parameter of channel state is sent to the terminal device through broadcast information or an RRC dedicated signaling. Exemplarily, the broadcast information may include a Master information block (MIB), a system information block (SIB) 1, and other SIB messages. For example, the configuration parameter is sent through the RRC dedicated signaling, such as an RRC reconfiguration message.

In S303, a target configuration parameter is determined among the at least one configuration parameter of channel state information according to the first information, for performing channel state measurement to obtain the channel state information.

Exemplarily, if the network device obtains the downlink channel information by converting the uplink channel information based on the artificial intelligence algorithm model, the terminal device determines that the transmission of current CSI-RS adopts the configuration parameter of the first CSI-RS, and the configuration parameter of the first CSI-RS may adopt a relatively low granularity to achieve the purpose of saving downlink signal overhead. For example, the configuration parameter of the CSI-RS with a relatively long period, a relatively small density or a relatively small number of ports may be adopted. If the network device does not obtain the downlink channel information by converting the uplink channel information based on the artificial intelligence algorithm model, the terminal device determines that the transmission of current CSI-RS adopts the configuration parameter of the second CSI-RS, and the configuration parameter of the second CSI-RS may adopt a relatively high granularity to improve the accuracy of CSI measurement. For example, the configuration parameter of the CSI-RS with a relatively short period, a relatively small density or a relatively large number of ports may be adopted.

In the communication method provided by the embodiments of the present disclosure, the network device sends the at least one configuration parameter of the channel state information to the terminal device, and the target configuration parameter is determined from the at least one configuration parameter of the channel state information according to the first information, for performing channel state measurement to obtain the channel state information. In this way, the corresponding state measurement method can be used according to the specific way of acquiring downlink channel information, so that the downlink signal overhead can be saved when the artificial intelligence algorithm model is adopted to obtain the downlink channel information, and the accuracy of CSI measurement can be improved when the artificial intelligence algorithm model is not adopted to acquire the downlink channel information, thereby the error of the measured channel state information is reduced while the signaling overhead is reduced, thus the accurate scheduling of channel resources in the communication system can be achieved.

Figure 4:
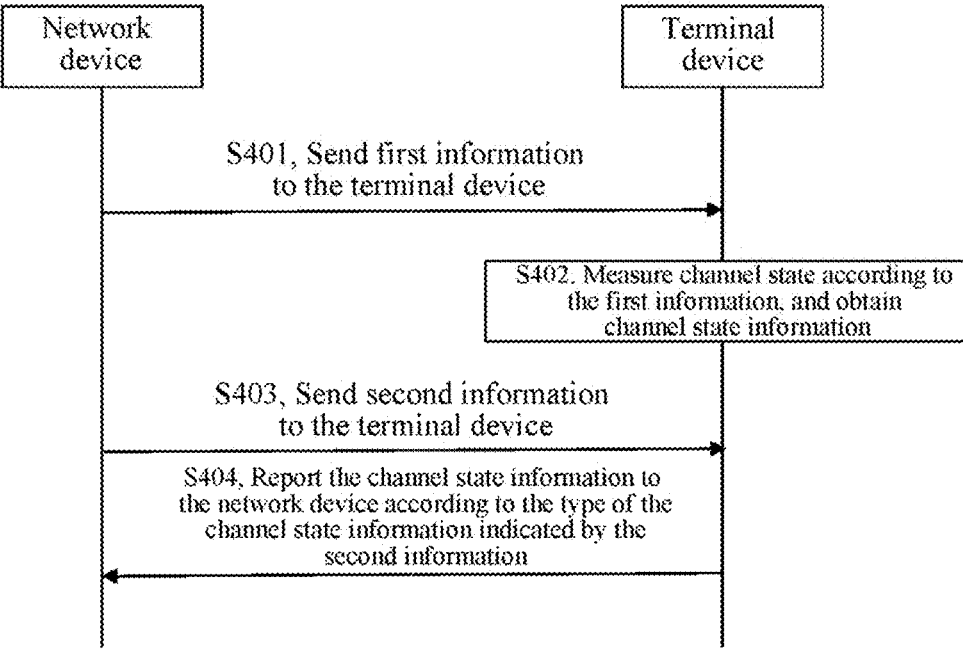
FIG. 4 is a signaling interaction diagram of still another communication method provided by an embodiment of the present disclosure.

Based on the above embodiments, after completing the channel state measurement, the network device may also send second information to the terminal device to indicate the type of the channel state information reported by the terminal device. FIG. 4 is a signaling interaction diagram of still another communication method provided by an embodiment of the present disclosure. As shown in FIG. 4, the communication method includes the following steps.

In S401, the network device sends first information to the terminal device, and the first information is configured to indicate whether the network device obtains downlink channel information through an artificial intelligence algorithm model, and the artificial intelligence algorithm model is established by training using historical uplink channel information and historical downlink channel information as samples.

In S402, the terminal device measures the channel state according to the first information, and acquires channel state information.

The technical terminologies, technical effects, technical features, and optional implementation manners of S401-S402 may be understood with reference to S201-S202 shown in FIG. 2, and repeated content will not be elaborated here.

In S403, the network device sends second information to the terminal device, where the second information is configured to indicate a type of channel state information reported by the terminal device.

In this step, after the terminal device measures the channel state and acquires the channel state information, the network device may also send the second information to the terminal device to indicate the terminal device the type of the channel state information to be reported.

Different types of the channel state information have different reporting amounts of information.

In an optional implementation manner, the types of the channel state information includes a first type and a second type, and the amount of information reported for the first type is less than or equal to the amount of information reported for the second type.

For example, the first type may be a reduced CSI reporting type, the second type may be a conventional CSI reporting type, and the CSI reporting configurations of the reduced CSI reporting type and the conventional CSI reporting type are different in terms of the CSI reporting amount, the used periodic configuration, the carried channel, etc. The reporting amount of the reduced CSI reporting type is one of the following combinations: channel quality indicator (CQI); CRI (CSI-RS); rank indicator (RI); CRI (CSI-RS)+CQI; CRI+RI; CQI+RI. The reporting amount of the conventional CSI reporting type is one of the following combinations: CRI+RI+precoding matrix indicator (PMI)+CQI; CRI+RI+i1; CRI+RI+i1+CQI; CRI+RI+CQI; CRI+configuration parameter Receiving Power (Reference Signal Receiving Power, RSRP); SSB RI+RSRP; CRI+RI+LI+PMI+CQI.

The reduced CSI reporting type may use the periodic physical uplink control channel to report the channel state information. The conventional CSI reporting type may use the physical uplink control channel or the physical uplink shared channel to report the channel state information.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In some embodiments, after it is determined that the downlink channel information is obtained through the artificial intelligence algorithm model, the integrity of the downlink channel information may also be verified. If the integrity exceeds a threshold, the terminal device is indicated to use the first type to report the channel state information. Correspondingly, if the downlink channel information is obtained through the artificial intelligence algorithm model and the downlink channel information is complete, the downlink precoding matrix is directly generated according to the downlink channel information for information transmission.

The embodiments of the present application do not limit how to send the second information. In some optional implementation manners, the second information may be sent to the terminal device through broadcast information. For example, the broadcast information may include a Master information block (MIB), a system information block (SIB) 1, and other SIB messages.

In some optional implementation manners, the second information may be sent to the terminal device through a random access procedure, for example, a message sent by a network device in a two-step random access procedure, or a random access response or contention resolution message sent by a network device in a four-step random access procedure.

In some optional implementation manners, the second information may be sent to the terminal device through a radio resource control (RRC) dedicated signaling.

In some optional implementation manners, the second information may be sent to the terminal device through a media access control-control element (MAC-CE).

In some optional implementation manner, the second information may be sent to the terminal device through downlink control information (DCI).

In S404, the terminal device reports the channel state information to the network device according to the type of the channel state information indicated by the second information.

In the communication method provided by the embodiments of the present disclosure, the second information is sent by the network device to the terminal device, and the second information is configured to indicate the type of the channel state information reported by the terminal device, so that the terminal device reports the channel state information by using a reporting mode with a relatively small reporting amount after obtaining the downlink channel information through the artificial intelligence algorithm model, thereby achieving the purpose of saving signaling overhead.

Figure 5:
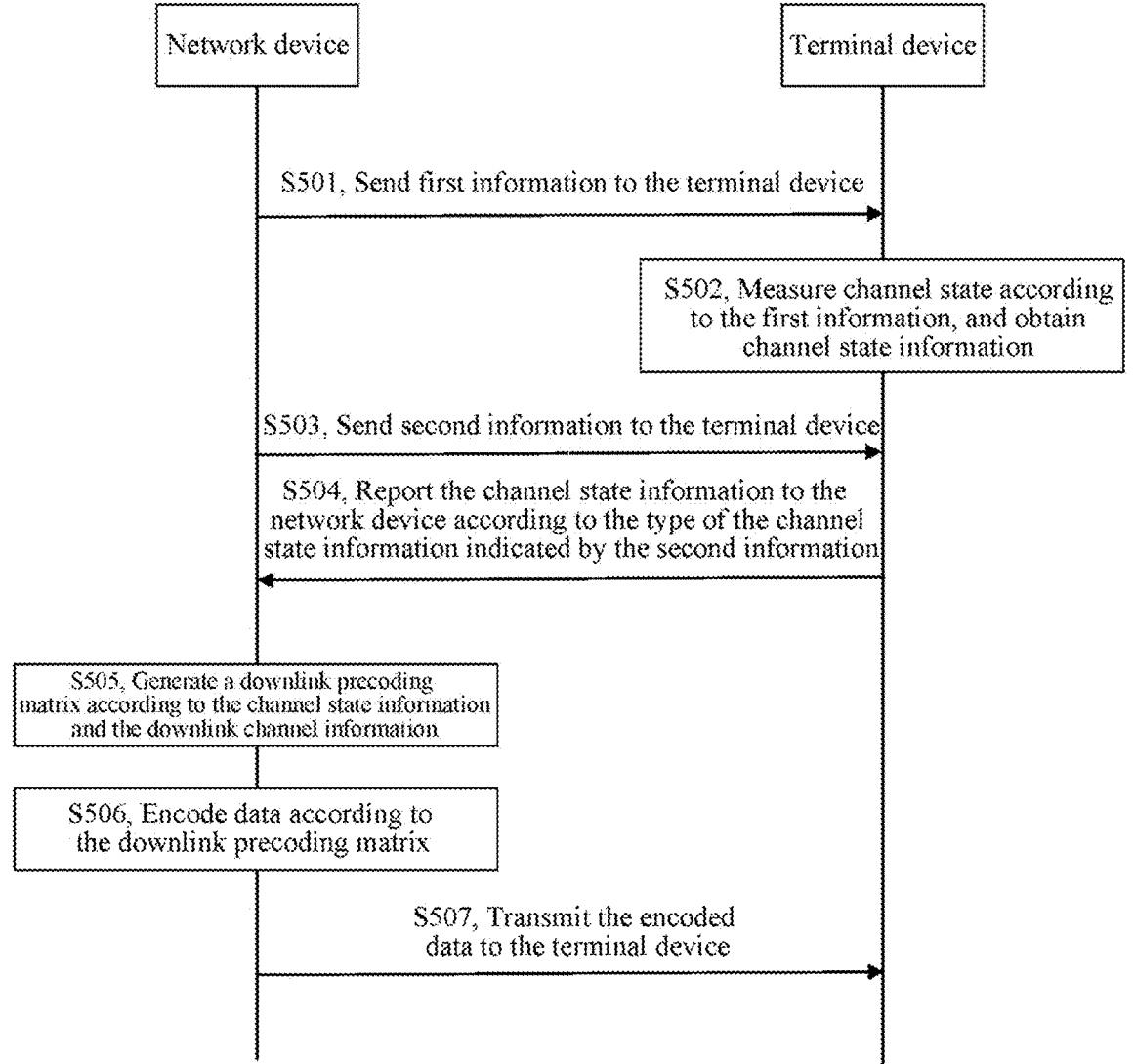
FIG. 5 is a signaling interaction diagram of still another communication method provided by an embodiment of the present disclosure.

Based on the above embodiments, the following describes how the network device transmits data with the terminal device after receiving the channel state information. FIG. 5 is a signaling interaction diagram of still another communication method provided by an embodiment of the present disclosure. As shown in FIG. 5, the communication method includes the following steps.

In S501, the network device sends first information to the terminal device, and the first information is configured to indicate whether the network device obtains downlink channel information through an artificial intelligence algorithm model, and the artificial intelligence algorithm model is established by training using historical uplink channel information and historical downlink channel information as samples.

In S502, the terminal device measures the channel state according to the first information, and acquires channel state information.

In S503, the network device sends second information to the terminal device, where the second information is configured to indicate to the terminal device a type of channel state information to be reported.

In S504, the terminal device reports the channel state information to the network device according to the type of the channel state information indicated by the second information.

The technical terminologies, technical effects, technical features, and optional implementation manners of S501-S504 may be understood with reference to S401-S402 shown in FIG. 4, and repeated content will not be elaborated.

In S505, the network device generates a downlink precoding matrix according to the channel state information and the downlink channel information.

In this step, since there is a certain lack of the downlink channel information obtained by the artificial intelligence algorithm model, after receiving the channel state information, the network device may collate the downlink channel information obtained by the artificial intelligence algorithm model and the channel state information to obtain complete downlink channel information, and generate the downlink precoding matrix based on the complete downlink channel information.

In some embodiments, after obtaining the downlink channel information through the artificial intelligence algorithm model, the network device may verify the integrity of the downlink channel information. If the complete downlink channel information can be obtained through the artificial intelligence algorithm model, the subsequent channel state information feedback process is not required, and the downlink channel information recovered by the artificial intelligence algorithm model may be directly used to design the downlink precoding matrix.

In an optional implementation manner, in the case that the downlink channel information is obtained through the artificial intelligence algorithm model and the downlink channel information is complete, the downlink precoding matrix is generated according to the downlink channel information.

In S506, the network encodes data according to the downlink precoding matrix.

The embodiments of the present disclosure do not limit how to encode data according to the downlink precoding matrix, and the data may be encoded according to the current encoding manner.

In S507, the network device transmits the encoded data to the terminal device.

It may be understood by a person of ordinary skill in the art that: all or part of the steps for implementing the above method embodiments may be accomplished by hardware related to program information, and the aforementioned program may be stored in a computer readable storage medium, and when the program is executed, the steps including the above method embodiments are implemented; and the aforementioned storage medium includes various medium capable of storing program codes, such as ROM, RAM, a magnetic disk, or an optical disk, etc.

Figure 6:
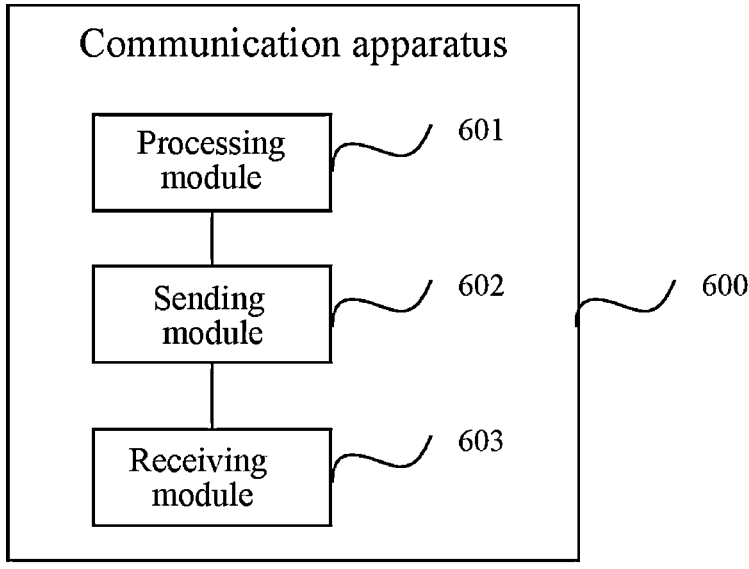
FIG. 6 is a schematic structural diagram of a communication apparatus provided by an embodiment of the present disclosure.

FIG. 6 is a schematic structural diagram of a communication apparatus provided by an embodiment of the present disclosure. The communication apparatus may be implemented by software, hardware or a combination thereof, and may be the network device or a chip of the network device in the foregoing embodiments. As shown in FIG. 6, the communication apparatus 600 includes: a processing module 601, a sending module 602 and a receiving module 603.

The sending module 602 is configured to send first information to a terminal device, where the first information is configured to indicate whether a network device obtains downlink channel information through an artificial intelligence algorithm model, and the artificial intelligence algorithm model is established by training using historical uplink channel information and historical downlink channel information as samples.

In an optional implementation manner, the sending module 602 is further configured to send at least one configuration parameter of channel state information to the terminal device, where the at least one configuration parameter of the channel state information is used for the terminal device to determine a target configuration parameter according to the first information, for performing channel state measurement to obtain the channel state information; and where, time-frequency resources and/or port densities of different configuration parameters of channel state are different.

In an optional implementation manner, the sending module 602 is further configured to send second information to the terminal device, where the second information is configured to indicate a type of channel state information reported by the terminal device.

In an optional implementation manner, different types of the channel state information report different amounts of information.

In an optional implementation manner, the types of the channel state information includes a first type and a second type, and the amount of information reported for the first type is less than or equal to the amount of information reported for the second type.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In an optional implementation manner, the receiving module 603 is configured to receive the channel state information reported by the terminal device according to the second information;

the processing module 601 is configured to generate a downlink precoding matrix according to the channel state information and the downlink channel information, and encode data according to the downlink precoding matrix; and the sending module 602 is further configured to transmit encoded data to the terminal device.

In an optional implementation manner, the processing module 601 is configured to generate a downlink precoding matrix according to the downlink channel information, in a case that the downlink channel information is obtained through the artificial intelligence algorithm model and the downlink channel information is complete.

In an optional implementation manner, the receiving module 603 is further configured to receive uplink channel information sent by the terminal device; and the processing module 601 is further configured to input the uplink channel information into the artificial intelligence algorithm model, and obtain the downlink channel information output by the artificial intelligence algorithm model.

In an optional implementation manner, the first information is further configured to indicate whether the network device has channel reciprocity.

In an optional implementation manner, the first information is sent to the terminal device through broadcast information;

or, the first information is sent to the terminal device through a random access procedure;

or, the first information is sent to the terminal device through a Radio Resource Control (RRC) dedicated signaling;

or, the first information is sent to the terminal device through a Media Access Control-Control Element (MAC-CE);

or, the first information is sent to the terminal device through Downlink Control Information (DCI).

In an optional implementation manner, the at least one configuration parameter of channel state is sent to the terminal device through broadcast information or an RRC dedicated signaling.

In an optional implementation manner, the second information is sent to the terminal device through broadcast information;

or, the second information is sent to the terminal device through a random access procedure;

or, the second information is sent to the terminal device through an RRC dedicated signaling;

or, the second information is sent to the terminal device through a MAC-CE;

or, the second information is sent to the terminal device through DCI.

In an optional implementation manner, the artificial intelligence algorithm model includes: a deep learning model and/or a machine learning model.

In an optional implementation manner, the deep learning model includes a convolutional neural network module, and the machine learning model includes at least one of the following models: a classification algorithm model, a regression algorithm model, a clustering algorithm model and a dimensionality reduction algorithm model.

The communication apparatus provided in the embodiments of the present disclosure may perform the actions of the communication method on the network device side in the foregoing method embodiments, and the implementation principles and technical effects thereof are similar, which are not repeated here.

Figure 7:
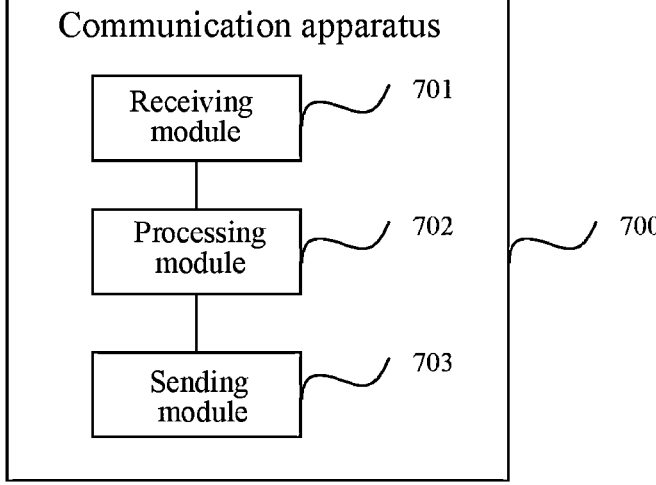
FIG. 7 is a schematic structural diagram of another communication apparatus provided by an embodiment of the present disclosure.

FIG. 7 is a schematic structural diagram of another communication apparatus provided by an embodiment of the present disclosure. The communication apparatus may be implemented by software, hardware or a combination thereof, and may be the terminal device or a chip of the terminal device in the foregoing embodiments. As shown in FIG. 7, the communication apparatus 700 includes: a receiving module 701, a processing module 702, and a sending module 703.

The receiving module 701 is configured to receive first information sent by a network device, where the first information is configured to indicate whether the network device obtains downlink channel information through an artificial intelligence algorithm model, and the artificial intelligence algorithm model is established by training using historical uplink channel information and historical downlink channel information as samples; and the processing module 702 is configured to measure channel state according to the first information to obtain channel state information.

In an optional implementation manner, the receiving module 701 is further configured to receive at least one configuration parameter of channel state information sent by the network device, where time-frequency resources and/or port densities of different configuration parameters of channel state are different; and the processing module 702 is specifically configured to determine a target configuration parameter among the at least one configuration parameter of channel state information according to the first information, for performing channel state measurement to obtain the channel state information.

In an optional implementation manner, the receiving module 701 is specifically configured to receive second information sent by the network device, where the second information is configured to indicate a type of channel state information reported by the terminal device; and the sending module 703 is configured to report the channel state information to the network device according to the type of the channel state information indicated by the second information.

In an optional implementation manner, different types of the channel state information report different amounts of information.

In an optional implementation manner, the types of the channel state information includes a first type and a second type, and the amount of information reported for the first type is less than or equal to the amount of information reported for the second type.

In an optional implementation manner, in a case that the downlink channel information is obtained through the artificial intelligence algorithm model, the second information is configured to indicate the terminal device to use the first type to report the channel state information; and in a case that the downlink channel information is not obtained through the artificial intelligence algorithm model, the second information is configured to indicate the terminal device to use the second type to report the channel state information.

In an optional implementation manner, the first information is further configured to indicate whether the network device has channel reciprocity.

In an optional implementation manner, the first information is sent to the terminal device through broadcast information;

or, the first information is sent to the terminal device through a random access procedure;

or, the first information is sent to the terminal device through a Radio Resource Control (RRC) dedicated signaling;

or, the first information is sent to the terminal device through a Media Access Control-Control Element (MAC-CE);

or, the first information is sent to the terminal device through Downlink Control Information (DCI).

In an optional implementation manner, the at least one configuration parameter of channel state is sent to the terminal device through broadcast information or an RRC dedicated signaling.

In an optional implementation manner, the second information is sent to the terminal device through broadcast information;

or, the second information is sent to the terminal device through a random access procedure;

or, the second information is sent to the terminal device through an RRC dedicated signaling;

or, the second information is sent to the terminal device through a MAC-CE;

or, the second information is sent to the terminal device through DCI.

In an optional implementation manner, the artificial intelligence algorithm model includes: a deep learning model and/or a machine learning model.

In an optional implementation manner, the deep learning model includes a convolutional neural network module, and the machine learning model includes at least one of the following models: a classification algorithm model, a regression algorithm model, a clustering algorithm model and a dimensionality reduction algorithm model.

The communication apparatus provided in the embodiments of the present disclosure may perform the actions of the communication method on the terminal device side in the foregoing method embodiments, and the implementation principles and technical effects thereof are similar, which are not repeated here.

Figure 8:
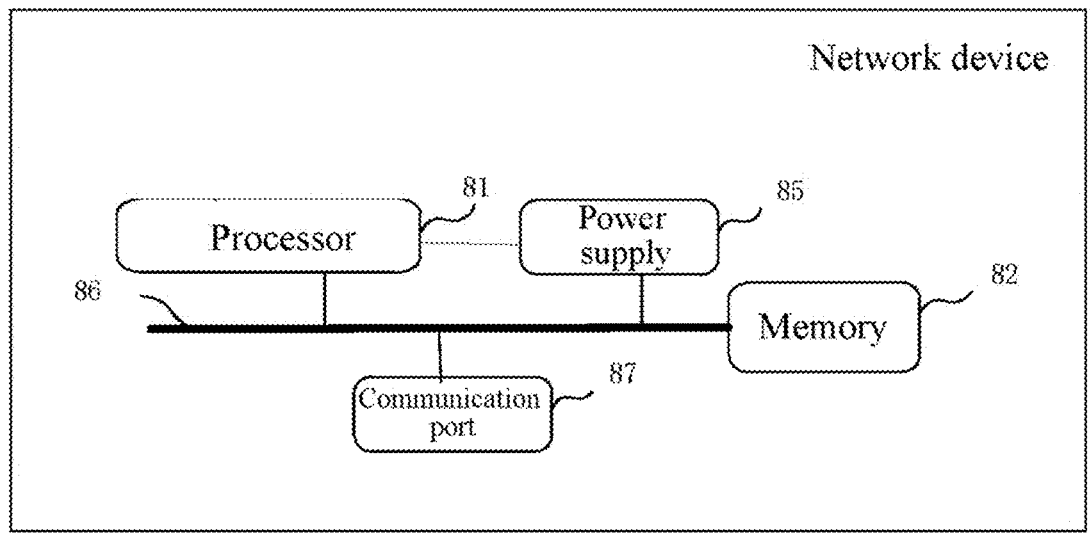
FIG. 8 is a schematic structural diagram of a network device provided by an embodiment of the present disclosure.

FIG. 8 is a schematic structural diagram of a network device provided by an embodiment of the present disclosure. As shown in FIG. 8, the network device may include: a processor 81 (e.g., a CPU) and a memory 82; the memory 82 may include a high-speed RAM memory, and may also include a non-volatile memory NVM, such as at least one disk memory, and various information may be stored in the memory 82 for completing various processing functions and implementing the steps of the methods in the embodiments of the present disclosure. Optionally, the network device involved in the embodiments of the present disclosure may further include: a power supply 85, a communication bus 86, and a communication port 87. The communication bus 86 is configured to enable communication connections between the elements. The above-mentioned communication port 87 is configured to implement connection and communication between the network device and other peripheral devices.

In the embodiments of the present disclosure, the memory 82 is configured to store a program code executable by a computer, and the program code includes information; when the processor 81 executes the information, the information enables the processor 81 to perform the processing actions of the network device in the foregoing method embodiments, and the implementation principles and technical effects thereof are similar, which are not repeated here.

Figure 9:
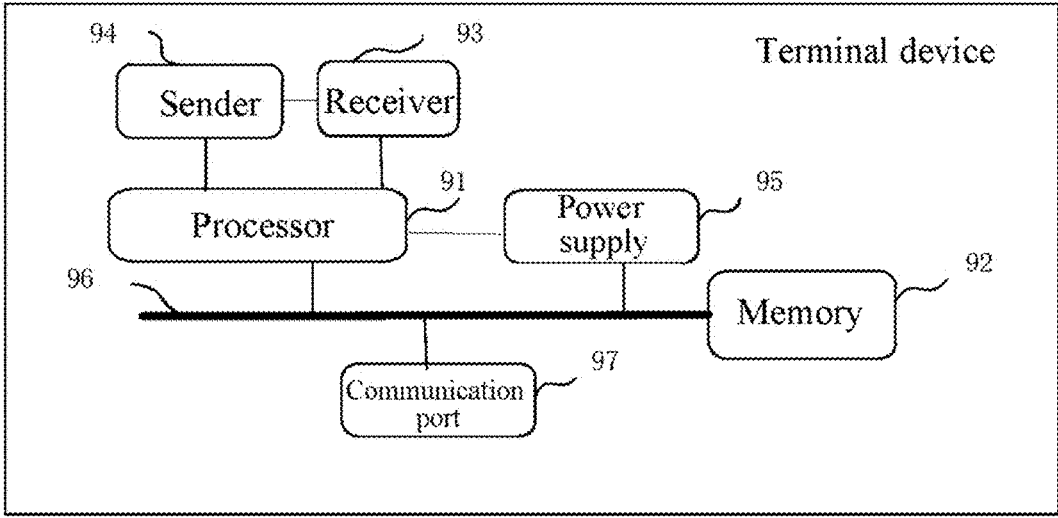
FIG. 9 is a schematic structural diagram of a terminal device provided by an embodiment of the present disclosure.

FIG. 9 is a schematic structural diagram of a terminal device provided by an embodiment of the present disclosure. As shown in FIG. 9, the terminal device may include: a processor 91 (e.g., a CPU), a memory 92, a receiver 93, and a sender 94; and the receiver 93 and the sender 94 are coupled to the processor 91, the processor 91 controls the receiving action of the receiver 93, and the processor 91 controls the sending action of the sender 94. The memory 92 may include a high-speed RAM memory, and may also include a non-volatile memory NVM, such as at least one disk memory, and various information may be stored in the memory 92 for completing various processing functions and implementing the steps of the methods in the embodiments of the present disclosure. Optionally, the terminal device involved in the embodiments of the present disclosure may further include: a power supply 95, a communication bus 96, and a communication port 97. The receiver 93 and the sender 94 may be integrated in the transceiver of the terminal device, or may be independent transceiver antennas on the terminal device. The communication bus 96 is configured to enable communication connections between the elements. The above-mentioned communication port 97 is configured to implement connection and communication between the terminal device and other peripheral devices.

In the embodiments of the present disclosure, the memory 92 is configured to store a program code executable by a computer, and the program code includes information; when the processor 91 executes the information, the information enables the processor 91 to perform the processing actions of the terminal device in the foregoing method embodiments, enables the sender 94 to perform the sending actions of the terminal device in the foregoing method embodiments, and enables the receiver 93 to perform the receiving actions of the terminal device in the foregoing method embodiments, and the implementation principles and technical effects thereof are similar, which are not repeated here.

The embodiments of the present disclosure further provides a communication system, including a terminal device and a network device, where the terminal device executes the above communication method on the terminal device side, and the network device executes the above communication method on the network device side.

The embodiments of the present disclosure further provides a chip, including a processor and an interface, where the interface is configured to input and output data or instructions processed by the processor, and the processor is configured to execute the methods provided in the above method embodiments. The chip may be applied to the terminal device or the network device.

The present disclosure further provides a computer-readable storage medium. The computer-readable storage medium may include: a USB flash drive, a removable hard drive, a Read-Only Memory (ROM), a Random Access Memory (RAM), a magnetic disk, an optical disk and other medium that can store program code. Specifically, the computer-readable storage medium stores program information, and the program information is used for the above communication method on the terminal device side or the above communication method on the network device side.

The embodiments of the present disclosure further provides a program, the program is configured to, when being executed by a processor, execute the communication method on the terminal device side, or the communication method on the network side provided by the above method embodiments.

The embodiments of the present disclosure further provides a program product, such as a computer-readable storage medium, where instructions are stored in the program product, and when the instructions are run on a computer, the program product enables the computer to execute the communication method on the terminal device side or the communication method on the network device side provided by the foregoing method embodiments.

The above embodiments may be implemented fully or partially by software, hardware, firmware, or any combination thereof. When it is implemented by software, it can be fully or partially implemented in a form of a computer program product. The computer program product includes one or more computer instructions. When computer program instructions are loaded and executed on a computer, the procedures or functions according to the embodiments of the present disclosure are fully or partially generated. The computer may be a general purpose computer, a special purpose computer, a computer network, or other programmable apparatus. The computer instructions may be stored in the computer-readable storage medium, or transmitted from one computer-readable storage medium to another computer-readable storage medium. For example, the computer instructions may be transmitted from one website site, computer, server, or data center to another website site, computer, server, or data center through a wire (e.g., a coaxial cable, a fiber optic, a digital subscriber line (DSL)) or a wireless manner (e.g., infrared, radio, microwave, etc.). The computer-readable storage medium may be any available medium that can be accessed by a computer or a data storage device such as a server, a data center, etc. that contains one or more integrated available mediums. The available medium may be magnetic medium, (e.g., a floppy disk, a hard disk, a tape), optical medium (e.g., a DVD), or semiconductor medium (e.g., a Solid State Disk (SSD)), etc.

Finally, it should be noted that the above embodiments are only used to illustrate the technical solutions of the present disclosure, but not to limit the present disclosure. Although the present disclosure has been described in detail with reference to the foregoing embodiments, those of ordinary skill in the art should understand that: the technical solutions described in the foregoing embodiments may be modified, or a part or all of the technical features thereof may be equivalently replaced. However, these modifications or replacements do not make the essence of the corresponding technical solutions deviate from the scope of the technical solutions of the embodiments of the present disclosure.

What is claimed is:

1. A communication method, comprising:

receiving first information sent by a network device, wherein the first information is configured to indicate whether the network device obtains downlink channel information through an artificial intelligence algorithm model, and the artificial intelligence algorithm model is established by training using historical uplink channel information and historical downlink channel information as samples; and measuring channel state according to the first information to obtain channel state information, wherein the measuring channel state according to the first information to obtain the channel state information, comprises:

in a case that the first information indicates that the network device obtains the downlink channel information through the artificial intelligence algorithm model, determining a first configuration parameter, for performing channel state measurement to obtain the channel state information; and in a case that the first information indicates that the network device does not obtain the downlink channel information through the artificial intelligence algorithm model, determining a second configuration parameter, for performing channel state measurement to obtain the channel state information;

wherein time-frequency resources and/or port densities of the first configuration parameter and the second confirmation parameter of channel state are different;

wherein the method further comprises:

receiving second information from the network device, wherein in a case that the downlink channel information is obtained through the artificial intelligence algorithm model, the second information is configured to indicate the terminal device to use a first type to report the channel state information; and wherein in a case that the downlink channel information is not obtained through the artificial intelligence algorithm model, the second information is configured to indicate the terminal device to use a second type to report the channel state information, and reporting the channel state information to the network device according to the first type or the second type, wherein an amount of information reported for the first type is less than an amount of information reported for the second type.

2. A communication apparatus, comprising: a processor and a memory;

wherein the memory is configured to store a computer program, and the processor is configured to invoke and run the computer program stored in the memory to:

send first information to a terminal device, wherein the first information is configured to indicate whether a network device obtains downlink channel information through an artificial intelligence algorithm model, and the artificial intelligence algorithm model is established by training using historical uplink channel information and historical downlink channel information as samples, in a case that the first information indicates that the network device obtains the downlink channel information through the artificial intelligence algorithm model, the first information is used for the terminal device to determine a first configuration parameter, for performing channel state measurement to obtain the channel state information; and in a case that the first information indicates that the network device does not obtain the downlink channel information through the artificial intelligence algorithm model, the first information is used for the terminal device to determine a second configuration parameter, for performing channel state measurement to obtain the channel state information;

wherein time-frequency resources and/or port densities of the first configuration parameter and the second configuration parameter of channel state are different;

wherein the processor is further configured to:

send second information to the terminal device, wherein in a case that the downlink channel information is obtained through the artificial intelligence algorithm model, the second information is configured to indicate the terminal device to use a first type to report the channel state information; wherein in a case that the downlink channel information is not obtained through the artificial intelligence algorithm model, the second information is configured to indicate the terminal device to use a second type to report the channel state information; and wherein an amount of information reported for the first type is less than an amount of information reported for the second type.

3. The apparatus according to claim 2, wherein the first information is further configured to indicate whether the network device has channel reciprocity, or, wherein the first information is sent to the terminal device through broadcast information; or the first information is sent to the terminal device through a random access procedure; or the first information is sent to the terminal device through a Radio Resource Control (RRC) dedicated signaling; or the first information is sent to the terminal device through a Media Access Control-Control Element (MAC-CE); or the first information is sent to the terminal device through Downlink Control Information (DCI).

4. The apparatus according to claim 2, wherein the at least one configuration parameter of channel state is sent to the terminal device through broadcast information or a Radio Resource Control (RRC) dedicated signaling.

5. The apparatus according to claim 2, wherein:

the second information is sent to the terminal device through broadcast information; or the second information is sent to the terminal device through a random access procedure; or the second information is sent to the terminal device through a Radio Resource Control (RRC) dedicated signaling; or the second information is sent to the terminal device through a Media Access Control-Control Element (MAC-CE); or the second information is sent to the terminal device through Downlink Control Information (DCI).

6. The apparatus according to claim 2, wherein the artificial intelligence algorithm model comprises: a deep learning model and/or a machine learning model, wherein the deep learning model comprises a convolutional neural network module, and the machine learning model comprises at least one of the following models: a classification algorithm model, a regression algorithm model, a clustering algorithm model and a dimensionality reduction algorithm model.

7. A communication apparatus, comprising:

a processor and a memory;

wherein the memory is configured to store a computer program, and the processor is configured to invoke and run the computer program stored in the memory to:

receive first information sent by a network device, wherein the first information is configured to indicate whether the network device obtains downlink channel information through an artificial intelligence algorithm model, and the artificial intelligence algorithm model is established by training using historical uplink channel information and historical downlink channel information as samples; and measure channel state according to the first information to obtain channel state information, wherein the processor is further configured to:

in a case that the first information indicates that the network device obtains the downlink channel information through the artificial intelligence algorithm model, determine a first configuration parameter, for performing channel state measurement to obtain the channel state information; and in a case that the first information indicates that the network device does not obtain the downlink channel information through the artificial intelligence algorithm model, determine a second configuration parameter, for performing channel state measurement to obtain the channel state information;

wherein the processor is further configured to:

receive second information from the network device, wherein in a case that the downlink channel information is obtained through the artificial intelligence algorithm model, the second information is configured to indicate the communication apparatus to use a first type to report the channel state information; wherein in a case that the downlink channel information is not obtained through the artificial intelligence algorithm model, the second information is configured to indicate the communication apparatus to use a second type to report the channel state information, and report the channel state information to the network device according to the first type or the second type, wherein an amount of information reported for the first type is less than an amount of information reported for the second type.

8. The apparatus according to claim 7, wherein the first information is further configured to indicate whether the network device has channel reciprocity, or, wherein the first information is sent to the communication apparatus through broadcast information; or the first information is sent to the communication apparatus through a random access procedure; or the first information is sent to the communication apparatus through a Radio Resource Control (RRC) dedicated signaling; or the first information is sent to the communication apparatus through a Media Access Control-Control Element (MAC-CE); or the first information is sent to the communication apparatus through a Downlink Control Information (DCI).

9. The apparatus according to claim 7, wherein the at least one configuration parameter of channel state is sent to the communication apparatus through broadcast information or a Radio Resource Control (RRC) dedicated signaling.

10. The apparatus according to claim 7, wherein:

the second information is sent to the communication apparatus through broadcast information; or the second information is sent to the communication apparatus through a random access procedure; or the second information is sent to the communication apparatus through a Radio Resource Control (RRC) dedicated signaling; or the second information is sent to the communication apparatus through a Media Access Control-Control Element (MAC-CE); or the second information is sent to the communication apparatus through Downlink Control Information (DCI).

11. The apparatus according to claim 7, wherein the artificial intelligence algorithm model comprises: a deep learning model and/or a machine learning model, wherein the deep learning model comprises a convolutional neural network module, and the machine learning model comprises at least one of the following models: a classification algorithm model, a regression algorithm model, a clustering algorithm model and a dimensionality reduction algorithm model.

* * * * *